A. Tumler.
Soda Water Fountain.
N° 110,804.     Patented Jan. 3, 1871.
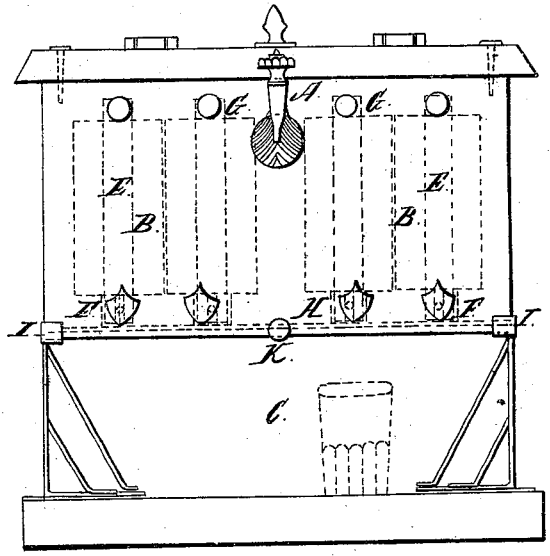
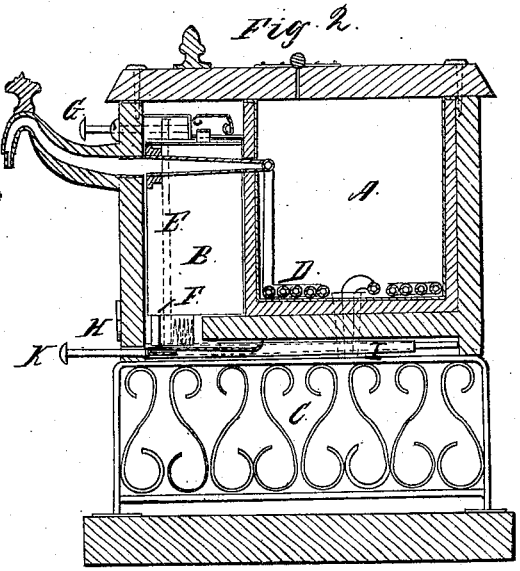
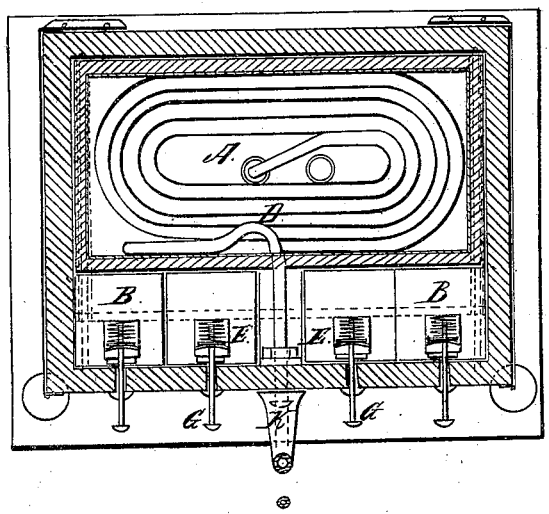
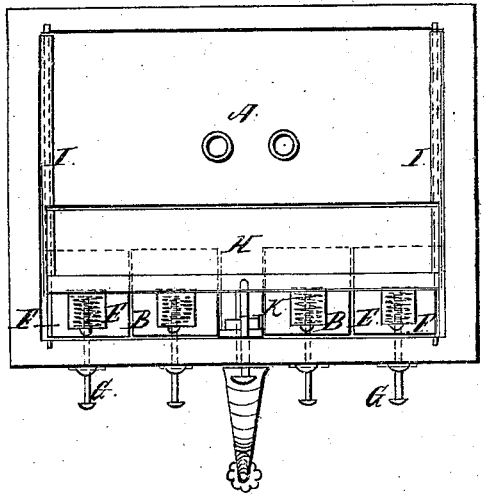
Witnesses:
Arthur Neill
Thomas Maloney
Inventor:
Antony Tumler

United States Patent Office.

ANTONY TUMLER, OF NEW YORK, N. Y.

Letters Patent No. 110,804, dated January 3, 1871.

IMPROVEMENT IN SODA-WATER FOUNTAINS.

The Schedule referred to in these Letters Patent and making part of the same.

I, ANTONY TUMLER, of the city, county, and State of New York, have invented certain Improvements in Soda-Water Fountain, of which the following is a specification.

I have observed that soda-water fountains, as at present constructed, were partially or entirely closed at the base, which, with slop or waste soda which overflows the drinking-vessels, tended to sweat or keep moist the lower chamber, thereby causing an unpleasant smell and attracting numerous insects.

I also found that the pipes or conductors through which the sirups for flavoring the soda-water were delivered were not protected from atmospheric influences, which omission in the construction of the fountain tended to spoil the sirups, while the exposure of the sirup-pipes attracted flies and other insects, which were carried with the sirup into the drinking-vessels.

These defects suggested to me the present improvements, the nature of which consists in constructing the fountain with an open base, through which the air circulates, rendering the base clean and sweet, as well as convenient for placing the drinking-vessels therein for reception of the sirups; and also in the application of a sliding gate to the sirup-tubes, whereby the air is not only excluded from contact with, but flies and other insects prevented access to, the sirups. as I will further explain by reference to the accompanying drawing, in which—

Figure 1 is a front elevation, showing the sirup-wells, exit-pipes, and gate in dotted lines;

Figure 2, a vertical section;

Figure 3, a horizontal section; and

Figure 4, a bottom or under-side view, showing the sirup-pipes and open gate.

In the drawing—

A indicates the ice-chamber;

B B, the sirup-wells; and

C, the open base of the soda-water fountain.

The ice-chamber is provided with a coil of pipe, D, through which the soda-water passes from the carbonic-acid vessel below the fountain.

The sirup-wells B are in front of the ice-chamber A, and are provided with levers, E, which abut against the outlet-pipes F at the bottom of the wells, and are operated by pulls, G G, at the upper ends of the levers, for permitting the sirup to flow through the pipes F.

H is the sliding gate for covering the ends of the sirup-tubes or pipes F after discharge of the sirup.

This gate slides on ways, I I, and has a pull, K, for pushing the gate back and forth so as to expose the pipes during exit of the sirup, or cover them up after discharge, and thereby prevent contact with the air, or access by flies or insects to the sirup-pipes; and C is the open base of the fountain, for free circulation of air, for preventing sweating of the fountain-base, for keeping the base sweet, and for convenience in placing the drinking-vessels below the fountain for reception of the sirups.

What I claim is—

The ice-chamber A, sirup-wells B, pipes F, sliding gate H, ways I I, and open base C, combined, arranged, and operating substantially as and for the purposes described and set forth.

In testimony whereof I have hereunto set my signature this 3d day of December, 1870.

ANTONY TUMLER.

Witnesses:
 ARTHUR NEILL,
 THOMAS MALONEY.